3,094,023
Patented June 18, 1963

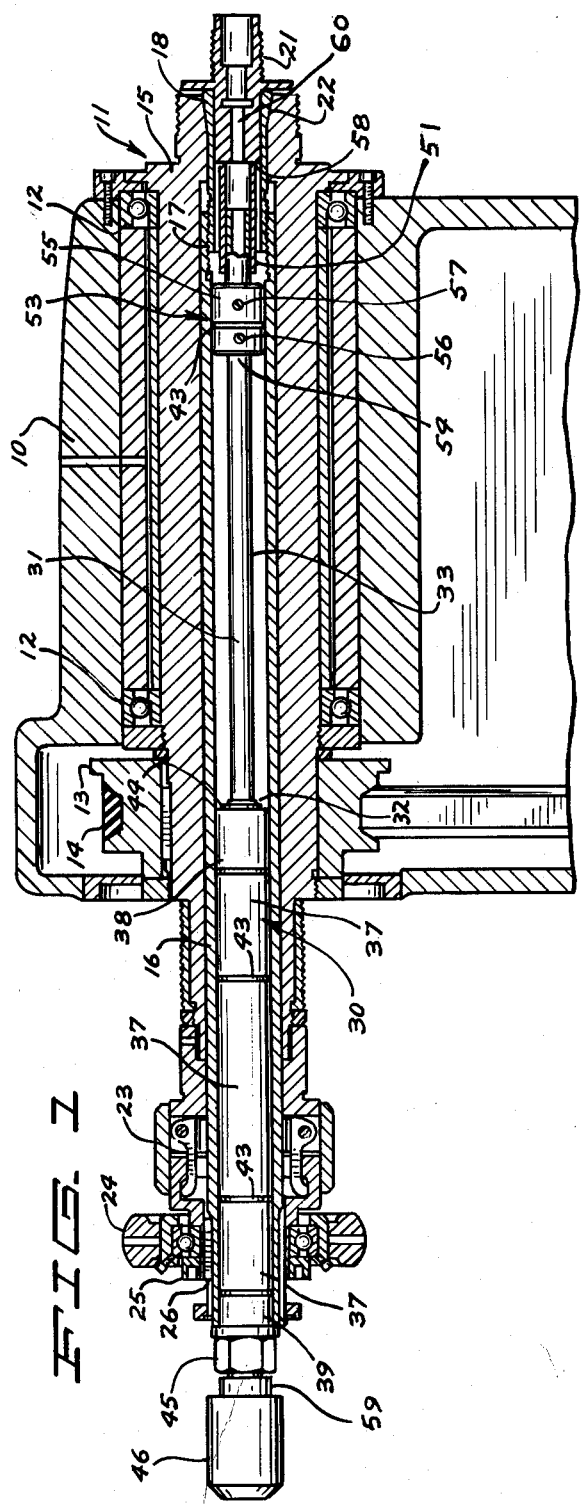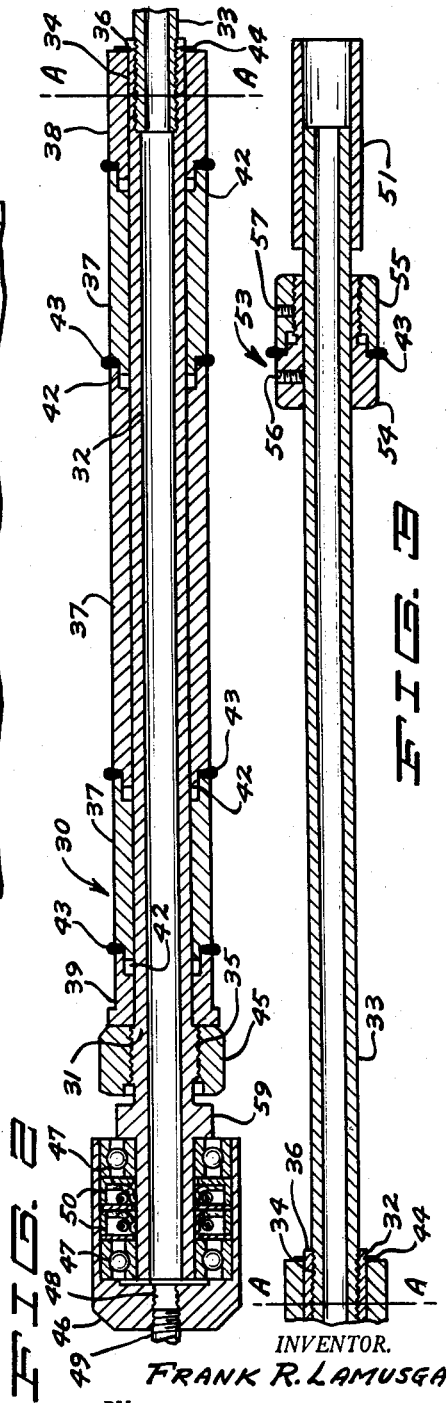
INVENTOR.
FRANK R. LAMUSGA
BY
Braddock and Braddock
ATTORNEYS

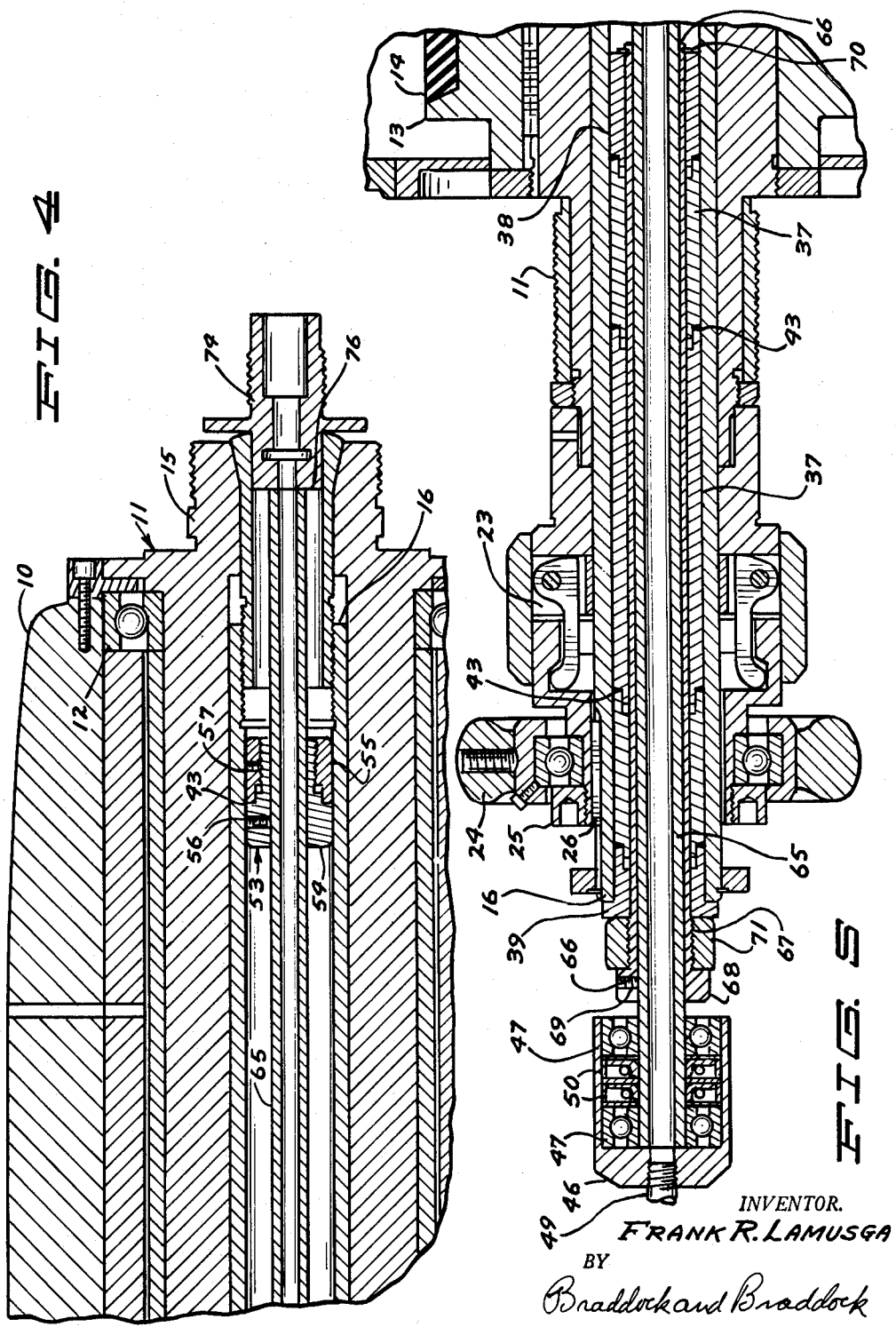

3,094,023
SPINDLE MOUNTED COOLANT CARRIER
Frank R. Lamusga, 3407 Polk St. NE., Minneapolis, Minn.
Filed Jan. 24, 1961, Ser. No. 84,672
4 Claims. (Cl. 82—34)

The present invention has relation to a device for carrying coolant to be used with machine tools and more particularly to a device that provides a conduit to carry a coolant through the spindle of a rotating machine tool to the work piece.

In the machining of small precision parts made of "exotic metals" and alloys with high hardness and strength the parts become very hot. The standard method of cooling these parts is by a flow of coolant that is directed onto the parts from a flexible hose attached to the lathe or other machine tool and that is impinged on the surfaces of the parts being machined. When machining the interior surfaces of a small part the coolant does not get inside the part in sufficient quantity to effect proper cooling. Also excess heat expands and warps the parts so that the tolerances required for missile and aircraft parts cannot be held.

The present invention discloses a device that may be used to direct coolant through the hollow center of the spindle shaft of a machine tool and will deposit the coolant directly on the interior surfaces of the parts being machined. The device may be used on any rotating machine tool that has a hollow spindle shaft and can be used for a variety of different parts having different lengths of material in the machine tool chuck. The device is sealed with respect to the parts with which it is associated to prevent leakage of the coolant and maintain a clean work area.

The present invention, in the form as disclosed, has a plurality of sleeve sections that are slid over rear portions of an elongated hollow tube that may be sealingly abutted against the piece being worked on. An annular ring of elastic material is placed between each of the sections and one end of the sections is held with respect to the hollow tube by a snap ring engaging the hollow tube at an intermediate portion thereof and also engaging the forward sleeve. A nut is threaded onto the hollow tube adjacent the rear end and is of dimension to engage the rear sleeve section so the sections can be tightened together. As the sections are tightened the elastic annular rings placed between the sleeve sections expand outwardly and become of a larger outer diameter than the sections with which they are associated. The entire assembly, comprised of the outer sleeve sections and the elongated tube, is of dimension to slide into the hollow spindle shaft of a machine tool. When the nut adjacent the rear end of the hollow tube is tightened the sleeve sections slide together against the elastic rings which expand to contact the inner surface of the hollow spindle and position the tube and sleeve assembly exactly concentric with the spindle shaft to insure no vibration at the high rotational speeds normally used to machine these parts. The elongated inner tube extends rearwardly beyond the nut and has a cap rotatably mounted over the rear end thereof on sealed ball bearings. Sealing elements are provided between the cap bearings to prevent coolant from leaking through the cap. The end of the cap has a tapped hole that is of dimension to threadably receive a conduit carrying a suitable coolant, such as oil or air. This tapped hole is aligned with the interior hole of the elongated tube. The tube is free to rotate with respect to the cap.

The work piece that is placed into the chuck is hollow and the hole in the work piece aligns with the hole through the elongated tube. The tube is butted up against the work piece to form a metal to metal seal to allow for passage of the coolant from the tube into the hole in the work piece. As the coolant is deposited on the surfaces that are being machined proper cooling is effected.

The elongated tube may be sectionalized so that different lengths of tube can be interchanged readily when a different work piece is used or it may be a continuous tube that is longitudinally adjustable with respect to the spindle. The junction sleeve previously described permits different work pieces to be machined without changing the tube sections if the unit is not adjustable.

It is an object of the present invention to present a device for carrying a coolant and applying it to the interior of a piece that is being machined.

In the drawings:

FIG. 1 is a fragmentary vertical sectional view of an engine lathe spindle assembly showing a coolant carrier made according to a first form of the present invention installed therein;

FIG. 2 is a vertical sectional view of a rear portion of the coolant carrier assembly of FIG. 1;

FIG. 3 is a vertical sectional view of a front portion of said coolant carrier assembly and is associated with FIG. 2 at line A—A;

FIG. 4 is a fragmentary vertical sectional view of a spindle and chuck showing a front portion of a second form of the present invention installed therein; and FIG. 5 is a fragmentary vertical sectional view showing the rear portions of said second form of the present invention installed in said spindle.

Referring specifically to FIGS. 1–3 and the numerals of reference thereon, an engine lathe head 10 has a spindle assembly 11 rotatably mounted on bearings 12, 12 and driven by a sheave 13 and a V-belt 14. V-belt 14 may be connected to a suitable electric motor (not shown). The spindle assembly 11 has an outer spindle shaft 15 that is hollow and a hollow chuck holder shaft 16 is slidably mounted in the interior of spindle shaft 15. The front end of the chuck holder shaft 16 is threaded as at 17 and a tapered chuck 18 is threadably mounted in the chuck holder shaft.

A work piece 21 may be inserted in the tapered chuck 18 and the chuck holder shaft 16 tightened by releasing a clutch 23 with a yoke 24 and turning a hub 25 that is keyed to the chuck holder shaft 16 with a key 26. The chuck holder shaft will rotate with respect to the spindle shaft and the chuck when it is tighened. The clutch may be moved to position to lock the chuck holder shaft and the spindle together so they will turn as a unit when the work piece is being machined. When the chuck holder shaft is tightened the tapered chuck is pulled back to contact a ramp-like surface 22 that forms the forward internal surface of the spindle shaft 15. The tapered chuck is clamped tightly on to the work piece and holds the work piece for machining. The foregoing will be recognized as a typical engine lathe spindle assembly and chuck.

A coolant carrier assembly indicated generally at 30 is positioned inside the chuck holder shaft 16 and extends therethrough. The carrier assembly is composed of an inner tube 31 that is made up of a rear section 32 and a front section 33 that are threadably mounted together as at 34.

The rear section of inner tube 31 has a threaded portion 35 adjacent a rear end thereof and has a snap ring groove 36 adjacent a forward end thereof. A plurality of sleeves 37 of various lengths are slidably fitted over the outer surface of the rear section 35. A front sleeve 38 is positioned adjacent snap groove 36 and a rear sleeve 39 is positioned adjacent the threaded portion 35 of rear section 32 of the inner tube. The adjoining sections of the sleeves 37, 38 and 39 are telescoped together as at 42 and one of a plurality of elastic annular rings 43 is positioned between adjacent sections of the sleeves.

The outer sleeves are held from going forward by a snap ring 44 positioned in snap ring groove 36 and are held at the rear end by a nut 45 that is threaded onto threads 35 and bears against rear sleeve 39. The sleeve sections may then be forced together and as they are forced together by turning nut 45 the resilient rings 43 will circumferentially expand and will become of larger diameter than the sleeves with which they are associated.

An end cap 46 is mounted over the rear end of rear section 32 of the inner tube and is rotatably mounted with respect to said tube on a pair of double sealed ball bearings 47, 47 that are pressed into the end cap and also onto the tube. End cap 46 has a threaded hole 48 that aligns with the hole through the inner tube 31. A conduit 49 is threaded into hole 48 and is further connected to a suitable source of coolant. A pair of spring loaded rotating seals 50, 50 are mounted in the end cap and seal on the inner tube. The seals prevent the coolant from leaking out of the end cap 46.

A front centering hub 53 is composed of a male hub section 54 and a female hub section 55 that are threadably mounted together and are slidably mounted over the forward section 33 of the inner tube 31. A resilient ring 43 is mounted between the centering hub sections and can be squeezed as the hub sections are threaded together. This expands the ring as previously done with the sleeves that are slidably mounted over the rear portion of the inner tube. The male hub section 54 may be held with respect to the forward section 33 of tube 31 with a set screw 56 and the female hub section 55 may be held from rotating with respect to the male hub section 54 with a set screw 57. The centering hub 53 may be moved longitudinally along the inner tube and may be locked in any desired position.

If it is desired to machine separate work pieces with chucking shanks of different lengths, a junction sleeve 51 may be slidably fitted over the forward end of the forward tube section 33. The junction sleeve 51 will then be butted against the work piece to form a seal with the work piece as at 58. Either the junction sleeve or a forward tube section of proper length can be used to carry the coolant into the interior of the hollow work piece. The abutting ends of the coolant carrying members and the work piece are both machined square and flat so that a metal to metal seal is effected between them. The seal is sufficient to insure a substantial flow of coolant into the work piece. Any coolant that may leak out is prevented from going rearwardly out the spindle by the seal formed with the resilient rings.

*Operation of First Form of Invention*

When the coolant carrier assembly is to be positioned within the chuck holder shaft 16, the centering hub 53 will be slid as far forward as possible with respect to the chuck holder shaft as illustrated in FIG. 1. The resilient ring 43 on the centering hub 53 will be expanded so that it binds slightly against the inner surface of chuck holder shaft 16 and firmly holds the forward end of tube 31 centered within the shaft. The resilient ring also seals against the inner surfaces of the shaft and prevents any coolant from leaking past the ring. The coolant carrier assembly 30 will be slid into the interior of the chuck holder shaft 16 and will be positioned so that the front end of the forward section 33 of tube 31 is contiguous to work piece 21 and forms a seal with the work piece as at 58.

When the coolant carrier assembly 30 has been properly positioned in the chuck holder shaft 16 the inner tube 31 will be held by a wrench placed on a flattened portion 59 adjacent the rear end of the tube and nut 45 will be tightened so that the outer sleeves 37, 38 and 39 will be forced against the snap ring 44 and will telescope with respect to each other until the resilient rings 43 that are placed between adjacent sleeves expand sufficiently to engage the inner surfaces of chuck holder shaft 16 to firmly hold the coolant carrier assembly within the shaft.

The resilient rings 43 keep the coolant carrier assembly from vibrating as the lathe is operated and also insure that the coolant carrier assembly is exactly centered with respect to the spindle. The resilient rings seal against the interior surface of the spindle shaft and prevent coolant from leaking past. The clearance between the sleeves 37, 38 and 39 and the interior surfaces of the chuck holder shaft 16 is quite small.

When the machine tool is started the spindle assembly 11 will turn and rotate work piece 21 that is held in the chuck and also will rotate the coolant carrier assembly 30 along with the other mechanism. The end cap 46 on the rear end of the coolant carrier assembly will remain stationary so that conduit 49 does not have to turn. The bearings 47, 47 provide the rotatable mounting between the end cap 46 and the rear section 32 of the inner tube. The coolant coming from a suitable source (not shown) will be introduced through conduit 49 into the interior of the inner tube 31 and carried by the tube forwardly to the work piece 21. The seal formed at 58 between the work piece and the tube will be sufficient to prevent coolant from leaking out. The coolant will then move into a hole 60 provided in the work piece 21 and will be effective to cool the interior surfaces of the work piece 21 and carry away the chips as it is being machined.

In some cases, for example where a partially assembled armature is being machined, oil or other liquid coolants should not be used. In that case, air may be introduced through conduit 49 and through the provided inner tube 31 to cool the workpiece and remove chips from the tool.

The seals 50, 50 are effective to prevent the coolant from escaping through the bearings 47, 47. The outer casings of the seals are pressed into the end cap and a spring loaded element seals on the shaft.

Close tolerance work is required when machining precision parts made of exotic metals such as missile and aircraft parts. The machining of these high strength high hardness metals generates a considerable amount of heat that must be dissipated in order to keep warpage at a minimum. The tube as shown deposits the coolant right into the tool area when internal machining is being done. This is the area of greatest heat and thus the coolant is applied at the most effective spot.

If the coolant is carried through a tube that is not concentric with the spindle shaft a shaft vibration develops at the high machining speeds and this vibration is transmitted to the work piece. Holding tight tolerances on a vibrating work piece is difficult if not impossible.

*Second Form of Invention*

Referring to FIGS. 4 and 5, a second form of the present invention is shown. The coolant carrier assembly 30 in this form of the invention consists of a unitary internal tube 65 that extends from the rear end of the coolant carrier assembly to the forward end. An intermediate tube 66 is slid over tube 65 and has a threaded portion 67 adjacent the rear end thereof and further has a collar 68 with a set screw 69 threadably mounted in said collar to hold said intermediate tube 66 and said internal tube 65 together. Intermediate tube 66 may have the same outside diameter as the rear portion 32 of the inner tube 31 in the first form of the invention. Sleeves 37, 38 and 39, which may be identical with the sleeves in the first form of the invention are slid over the intermediate tube 66 and held retained thereon between a snap ring 70 and a nut 71. A plurality of resilient rings 43 are also placed between adjacent sections of the sleeves 37, 38 and 39 and the sleeves may be tightened together by turning nut 71 and pressing the sleeves against snap ring 70. End cap 46 is identical with the end cap in the previous form of the invention and is rotatably mounted onto internal tube 65.

The forward end of the internal tube 65 is also supported with a centering hub 53 as in the previous form of the invention. The internal tube 65 may be adjusted longitudinally with respect to the spindle shaft to provide for a tight fit against a short work piece 74 by loosening set screw 69 and sliding the internal tube 65 with respect to intermediate tube 66 until it butts against work piece 74 in a sealing relationship as at 76. The forward end of tube 65 and the work piece are both machined square so they fit tightly together and the seal is sufficient to insure a substantial flow of coolant through the piece. The resilient rings 43 prevent any coolant that may leak out between the tube and work piece from being carried rearwardly through the spindle.

*Operation of Second Form of Invention*

The second form of the invention operates substantially identical with the first form. The front hub of the coolant carrier assembly is adjusted so the elastic ring 43 on the hub binds slightly on the inner surfaces of the hollow chuck holder shaft. The assembly is then inserted into the chuck holder shaft 16 and nut 71 is tightened against the sleeves to expand the elastic rings 43 so they sealingly bind against the inner surface of the chuck holder shaft to position the assembly exactly concentric with the chuck holder shaft. In addition, the rings seal the chuck holder shaft so the coolant can't leak out.

The set screw 69 may be loosened and the inner tube 65 may be slid longitudinally with respect to the intermediate tube so it contacts and seals against the work piece 74. The set screw 69 may be then retightened and the tube held in this position. The inner tube 65 may be adjusted to seal on different work pieces.

The coolant will come through conduit 49, through the cap 46 and through tube 65 to the work piece. The coolant will pass through the work piece and in so doing cool the piece and carry away the loose chips.

What is claimed is:

1. A coolant carrying device mounted inside of a tubular rotatable spindle shaft having means for holding a hollow work piece at a first end thereof, said device including an elongated inner tube positioned with a first end thereof in sealing relationship with said work piece and open to an opening through said work piece, a plurality of sleeves slidably mounted over said inner tube and being slidable into said spindle shaft, an annular elastic ring mounted between adjacent sleeves, means for moving said sleeves longitudinally toward each other to compress said annular rings to cause said rings to expand to sealingly engage an inner surface of said rotatable shaft, said inner tube extending outwardly from a second end of said spindle shaft, a cap rotatably mounted over the outwardly extending end of said inner tube, rotatable sealing means mounted between said cap and said inner tube, and a conduit open from a source of coolant, connected to said cap and open to the interior of said inner tube, said conduit, said cap and said inner tube providing a passageway for said coolant from said source to said work piece.

2. The combination as specified in claim 1 wherein said inner tube is made of two sections threadably joined together, said sleeves being mounted over a first of said sections, a second of said sections extending from said first section to said work piece, and wherein said second section has a centering hub slidably mounted thereon, said hub including two adjacent hub sections of dimension to slide within said spindle shaft, a resilient ring between said hub sections positioned to engage the inner surface of said spindle shaft when said hub sections are moved together to compress said ring, and means for holding said centering hub stationary on said second tube section and said hub sections fixed with respect to each other.

3. The combination as specified in claim 1 wherein said inner tube terminates in spaced relationship with said work piece, and a junction tube sealingly slidably fitted over said inner tube and positioned to sealingly contact said work piece, said junction tube being open to the opening in said work piece.

4. A coolant carrying device mounted inside of a tubular rotatable spindle shaft having means for holding a hollow work piece at a first end thereof, said device including an elongated inner tube positioned within said spindle shaft with a first end thereof in sealing relationship with said work piece and open to an opening through said work piece, an intermediate tube slidably fitted over said inner tube and terminating short of opposite ends of said inner tube, releasable means for fixedly positioning said intermediate tube with respect to said inner tube, a plurality of sleeves slidably fitted over said intermediate tube and of dimension to slidably fit within said spindle shaft, an annular elastic ring mounted between adjacent sleeves, means for longitudinally moving said sleeves toward each other to compress said annular rings until the outer surface of each of said rings expands to sealingly engage an inner surface of said rotatable shaft, said inner tube extending outwardly from a second end of said spindle shaft, a cap rotatably mounted over the outwardly extending end of said inner tube, rotatable sealing means between said cap and said inner tube, and a conduit open from a source of coolant and connected to said cap and open to the interior of said inner tube, said conduit, said cap and said inner tube providing a passageway for said coolant from said source to said work piece.

References Cited in the file of this patent

UNITED STATES PATENTS

| | | |
|---|---|---|
| Re. 16,043 | Joseph | Apr. 14, 1925 |
| 1,315,427 | Smith et al. | Sept. 9, 1919 |